(12) United States Patent
Olvera-Hernandez et al.

(10) Patent No.: US 8,238,261 B2
(45) Date of Patent: Aug. 7, 2012

(54) METHOD AND APPARATUS FOR IDENTIFYING MOBILE NETWORK PROTOCOL CAPABILITIES

(75) Inventors: Ulises Olvera-Hernandez, Kirkland (CA); Alan G. Carlton, Mineola, NY (US); Juan Carlos Zuniga, Montreal (CA)

(73) Assignee: InterDigital Technology Corporation, Wilmington, DE (US)

( * ) Notice: Subject to any disclaimer, the term of this patent is extended or adjusted under 35 U.S.C. 154(b) by 886 days.

(21) Appl. No.: 12/062,792

(22) Filed: Apr. 4, 2008

(65) Prior Publication Data
US 2009/0092094 A1 Apr. 9, 2009

Related U.S. Application Data

(60) Provisional application No. 60/910,494, filed on Apr. 6, 2007.

(51) Int. Cl.
*H04L 12/26* (2006.01)
*H04W 4/00* (2009.01)
(52) U.S. Cl. .................................. 370/252; 370/331
(58) Field of Classification Search .................. 370/310, 370/328, 338
See application file for complete search history.

(56) References Cited

U.S. PATENT DOCUMENTS

| | | | |
|---|---|---|---|
| 6,832,087 B2 | 12/2004 | Gwon et al. | |
| 7,092,696 B1 * | 8/2006 | Hosain et al. | 455/405 |
| 7,313,628 B2 * | 12/2007 | Chaskar et al. | 709/238 |
| 7,346,684 B2 * | 3/2008 | Borella | 709/225 |
| 7,480,307 B2 * | 1/2009 | Chaskar et al. | 370/401 |
| 7,483,984 B1 | 1/2009 | Jonker et al. | |
| 7,710,923 B2 * | 5/2010 | Carlton | 370/331 |
| 7,818,453 B2 | 10/2010 | Haumont et al. | |
| 7,839,815 B2 * | 11/2010 | Feder et al. | 370/328 |
| 2003/0193909 A1 * | 10/2003 | Wang et al. | 370/330 |
| 2004/0063426 A1 * | 4/2004 | Hunkeler | 455/426.1 |
| 2004/0103204 A1 | 5/2004 | Yegin | |
| 2004/0184465 A1 * | 9/2004 | Lee et al. | 370/400 |
| 2004/0202140 A1 * | 10/2004 | Kim et al. | 370/335 |
| 2005/0099976 A1 * | 5/2005 | Yamamoto et al. | 370/331 |
| 2005/0227692 A1 | 10/2005 | Kawashima et al. | |

(Continued)

FOREIGN PATENT DOCUMENTS

KR 2005-0069398 7/2005

(Continued)

OTHER PUBLICATIONS

Daley et al., "Some Requirements for a Media Independent Handover Information Service," Network Working Group, Internet-draft (Jun. 28, 2005) available at: http://ietfreport.isoc.org/all-ids/draft-faccin-mih-infoserv-00.txt (last visited Sep. 17, 2008).

Daley et al., "Some Requirements for a Media Independent Handover Information Service," Network Working Group, Internet-draft (Jun. 28, 2005) available at http:ietfreport.isoc.org/all-ids/draft-faccin-mih-infoserv-00.txt (last visited Sep. 17, 2008).

(Continued)

*Primary Examiner* — Warner Wong
(74) *Attorney, Agent, or Firm* — Volpe and Koenig, P.C.

(57) ABSTRACT

A method and apparatus for improving handover in an IEEE 802.21 compliant communication network. A query is transmitted from a wireless transmit/receive unit (WTRU) to a media independent handover (MIH) server (MIHS). The WTRU includes a target point of attachment (PoA) and/or a preferred mobile inter protocol (MIP) method. The WTRU receives a response from the MIHS indicating the MIP method supported by the target PoA. Based on the received response, the WTRU may make an informed decision regarding handover.

28 Claims, 4 Drawing Sheets

U.S. PATENT DOCUMENTS

| | | | |
|---|---|---|---|
| 2006/0099948 A1* | 5/2006 | Hoghooghi et al. | 455/436 |
| 2007/0025294 A1* | 2/2007 | Kim et al. | 370/331 |
| 2007/0088853 A1* | 4/2007 | Lee et al. | 709/249 |
| 2007/0160049 A1* | 7/2007 | Xie et al. | 370/390 |
| 2007/0230453 A1* | 10/2007 | Giaretta et al. | 370/389 |
| 2007/0242628 A1* | 10/2007 | Dutta et al. | 370/310 |
| 2008/0037478 A1* | 2/2008 | Na et al. | 370/338 |
| 2008/0096558 A1* | 4/2008 | Liu et al. | 455/435.2 |
| 2008/0304454 A1* | 12/2008 | Zhong et al. | 370/331 |
| 2010/0165947 A1* | 7/2010 | Taniuchi et al. | 370/331 |

FOREIGN PATENT DOCUMENTS

| | | |
|---|---|---|
| WO | 2005/008630 | 1/2005 |
| WO | 2006/052563 | 5/2006 |
| WO | 2006/009599 | 9/2006 |
| WO | 2006/095994 | 9/2006 |
| WO | 2006/099400 | 9/2006 |
| WO | 2006/132487 | 12/2006 |

OTHER PUBLICATIONS

Daley et al., "Some Requirements for a Media Independent Handover Information Service," Network Working Group, Internet-draft (Jun. 28, 2005) available at http:ietfreport.isoc.org/all-ids/draft-faccin-mih-infoserv-00.txt (last visited Sep. 17, 2008).

Gundavelli et al., "Proxy Mobile IPV6, Draft-Sgundave-Mip6-Proxymip6-02.txt", NETLMM WG, Internet-Draft, (Sep. 6, 2007).

Gupta, "IEEE P802.21 Tutorial," IEEE 802.21 Media Independent Handover (Jul. 17, 2006).

Lan Man Standards Committee of the IEEE Computer Society, "IEEE P802.21/D04.00, Draft Standard for Local and Metropolitan Area Networks: Media Independent Handover Services", IEEE P802.21/D04.00, (Feb. 2007).

Lan Man Standards Committee of the IEEE Computer Society, "IEEE P802.21/D05.00, Draft Standards for Local and Metropolitan Area Networks: Media Independent Handover Services", IEEE P802.21/D05.00, (Apr. 2007).

* cited by examiner

FIG. 4

| 405 | 410 | 415 | 420 | 425 | 430 | 435 | 440 | 445 | 450 |
|---|---|---|---|---|---|---|---|---|---|
| SOURCE ID | DESTINATION ID | CURRENT LINK ID | NEW PoA IDENTIFIER | TARGET PoA IDENTIFIER LIST | CURRENT IP CONFIGURATION METHOD | CURRENT DHCP SERVER ADDRESS | CURRENT FA ADDRESS | CURRENT ACCESS ROUTER ADDRESS | REQUESTED MIP MOBILITY METHOD |

| 505 | 510 | 515 | 520 | 525 | 530 | 535 | 540 |
|---|---|---|---|---|---|---|---|
| SOURCE ID | DESTINATION ID | CURRENT LINK ID | NEW PoA IDENTIFIER | IP CONFIGURATION METHOD | DHCP SERVER ADDRESS | ACCESS ROUTER ADDRESS | RESULT CODE |

500

METHOD AND APPARATUS FOR IDENTIFYING MOBILE NETWORK PROTOCOL CAPABILITIES

CROSS REFERENCE TO RELATED APPLICATION

This application claims the benefit of U.S. provisional application No. 60/910,494, filed Apr. 6, 2007 which is incorporated by reference as if fully set forth.

TECHNOLOGY FIELD

This subject matter disclosed herein is generally related to wireless communication systems.

BACKGROUND

The IEEE 802.21 standard defines mechanisms and procedures that aid in the execution and management of inter-system handovers. IEEE 802.21 defines three main services available to Mobility Management applications, such as Client Mobile Internet Protocol (Client MIP) or Proxy MIP. Referring to FIG. 1, these services are the Event Service 100, the Information Service 105 and the Command Service 110. These services aid in the management of handover operations, system discovery and system selection by providing information and triggers from lower layers 115 to upper layers 120 via a media independent handover (MIH) function 125.

Within the context of the command service 110, functionality is defined for querying an MIH compatible node to determine the node's Internet Protocol (IP) capabilities. This is accomplished via the MIH_Network_Address_Information Request message sent from a wireless transmit/receive unit (WTRU) and the MIH_Network_Address_Information Response message sent from the MIH compatible node.

Certain systems, such as the Third Generation Partnership Project Long Term Evolution (3GPP LTE) system, utilize a hybrid mobility schema where both client MIP and proxy MIP are used. Proxy MIP is preferred because of its well known advantages such as elimination of over-the-air (OTA) tunnelling overhead, greater flexibility, and reduced latency. However, in a roaming scenario it is highly likely that a WTRU will encounter networks that do not support proxy MIP. In this scenario, client MIP is used.

Under the current IEEE 802.21 standard, a WTRU is unable to determine whether an accessible network provides support for localized mobility procedures (such as proxy MIP) or only conventional mobility procedures (such as client MIP). This information is an important criterion in network selection. Selection of a network with undesirable mobility management procedures will result in sub-optimal mobility scenarios. Furthermore, if a WTRU is able to determine the MIP characteristics of a network, the WTRU may trigger IEEE 802.21 procedures to improve mobility handling.

SUMMARY

A method and apparatus for improving handover in IEEE 802.21 compliant communications. A query is transmitted from a WTRU to a MIH server (MIHS). The WTRU includes a target point of attachment (PoA) and/or a preferred MIP method. The WTRU receives a response from the MIHS indicating the MIP method supported by the target PoA. Based on the received response, the WTRU may make an informed decision regarding handover.

BRIEF DESCRIPTION OF THE DRAWINGS

A more detailed understanding of the invention may be had from the following description, given by way of example and to be understood in conjunction with the accompanying drawings wherein:

FIG. 4 is a diagram of a MIH_Network_Address_Information Request message disclosed herein;

FIG. 5 is a diagram of a MIH_Network_Address_Information Response message disclosed herein.

DETAILED DESCRIPTION

When referred to herein, the terminology "wireless transmit/receive unit (WTRU)" includes but is not limited to a user equipment (UE), a mobile node, mobile station (STA), a fixed or mobile subscriber unit, a pager, a cellular telephone, a personal digital assistant (PDA), a computer, or any other type of user device capable of operating in a wireless environment. When referred to hereafter, the terminology "access point" includes but is not limited to a Node-B, a site controller, a base station (BS), or any other type of interfacing device capable of operating in a wireless environment.

A solution to the aforementioned problem is to provide a WTRU with information regarding the MIP capabilities of a network. The network is preferably a prospective network to which the WTRU is considering a handover to. In one embodiment, a request message includes an identifier of a network that is the target network for handover. An associated response message includes MIP capabilities of the identified network.

Figure 2:
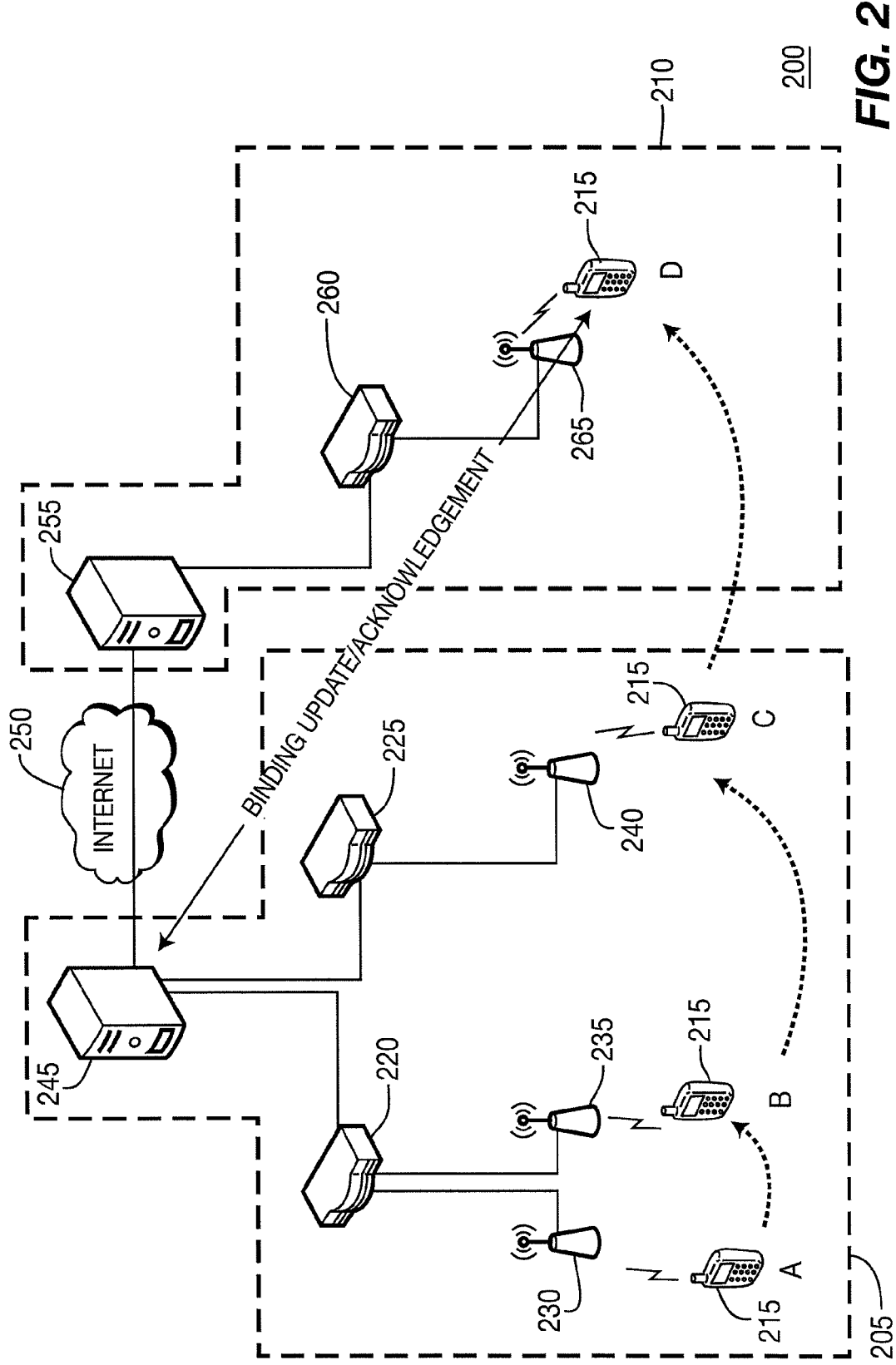
FIG. 2 shows a wireless communication system in which a WTRU is unable to obtain mobility management information regarding diverse networks located therein.

FIG. 2 is a communication system 200 including two distinct networks 205 and 210 where mobility management information is not available to WTRU 215. network 205 includes multiple network routers (220, 225) and three access points 230, 235, and 240. A server 245 of the first network 205 communicates with the network routers 220, 225 and servers of other networks via the Internet 250, for example. The second network 210 also includes a server 255, a network router 260, and an access point 265. It is noted that the first network 205 and second network 210 may be of the same or different type.

In the communication system 200, localized mobility management protocols, such as proxy MIP, are supported only in the first network 205. When WTRU 215 is communicating with access points 230, 235, and 240 (locations A, B, and C, respectively), localized mobility management is available for inter-access point handovers. However, second network 210 does not support localized mobility management protocols and instead supports only client MIP. When WTRU 215 is in communication with the second network 210 (position D) via access point 265, WTRU 215 will perform client MIP procedures, including Client originated MIP Binding Update procedures. This client MIP procedure may potentially delay handover of the WTRU 215 to access point 265 in the second network 210.

Figure 3:
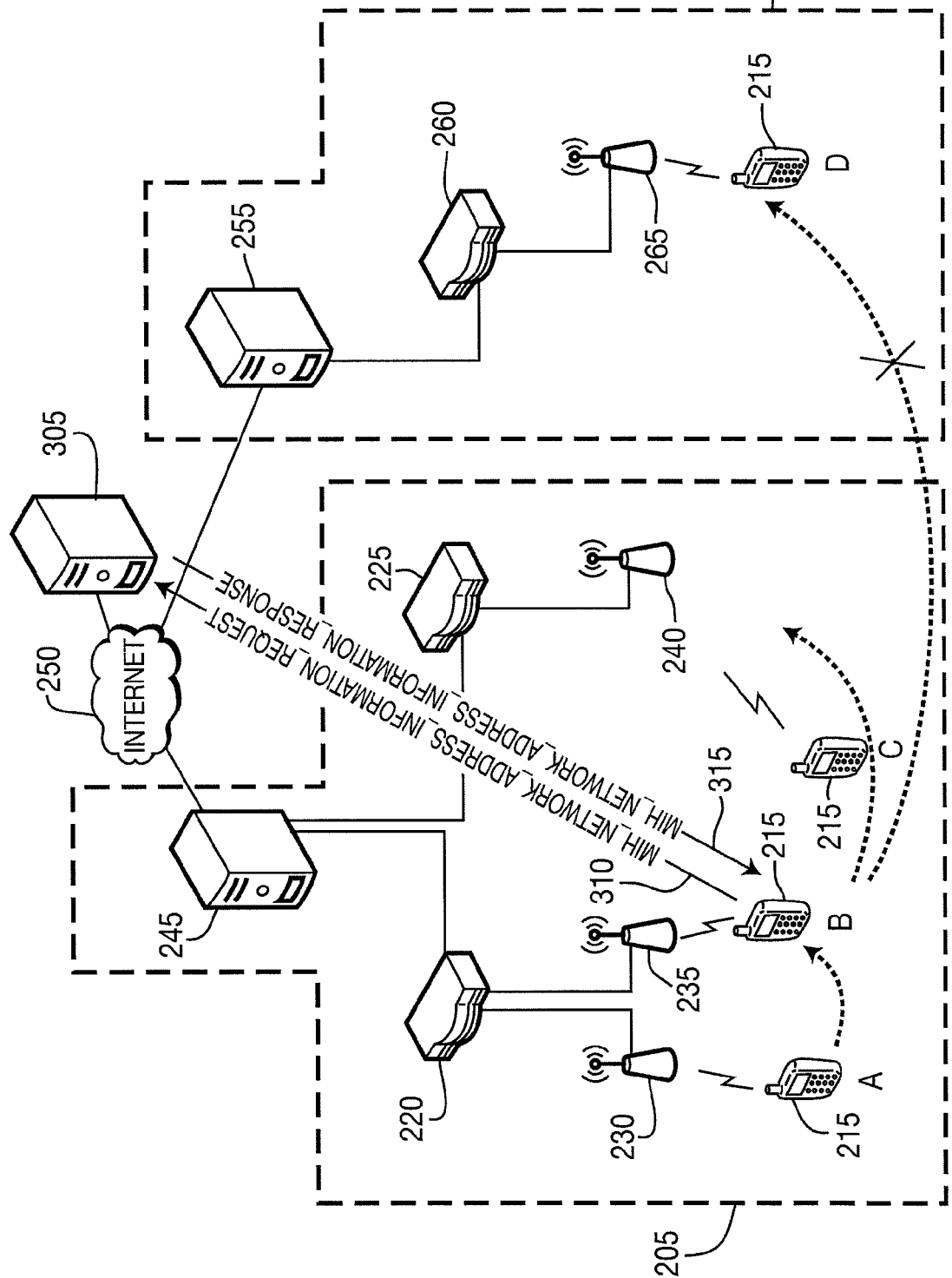
FIG. 3 shows an enhanced network of FIG. 2, in which a WTRU may query a MIH server and receive mobility management information regarding diverse networks located therein.

Referring to FIG. 3, a wireless communication system 300 includes all of the elements identified above with respect to FIG. 2 as well as an MIH server (MIHS) 305 accessible via the Internet 250. The MIHS 305 controls various aspects of MIH and coordinates services between WTRUs and various networks. When WTRU 215 is associated with access point 240, the WTRU 215 may query the MIHS 305 to determine the capabilities of surrounding networks. This may be achieved via the MIH_Network_Address_Information_Request message 310, sent from the WTRU 215 to the MIHS 305. The prospective point of attachment (PoA) in the prospective network (second network 210) may be identified in the message 310, in this scenario access point 265. In response, the MIHS 305 provides information regarding the characteristics of the prospective network (second network 210), such as whether proxy MIP is supported. The MIHS 305 responds to the MIH_Network_Address_Information_Request message 310 by sending a MIH_Network_Address_Information_Response message 315 including the requested information.

Alternatively, the MIH_Network_Address_Information Request message 310 may simply indicate the MIP preferences of the WTRU 215. In this scenario, the MIHS 305 will identify networks that are capable of supporting the WTRU's 215 MIP preference. Based on the information received from the MIHS 305 in the MIH_Network_Address_Information_Response message 315, the WTRU 215 may choose access point 240 or access point 265, depending on supported MIP services and preference.

Referring to FIG. 4, the MIH_Network_Address_Information Request message 400 includes a Source ID field 405, a Destination ID field 410, a Current Link ID field 415, a New PoA Identifier field 420, a Target PoA Identifier List field 425, a Current IP Configuration Method field 430, a Current dynamic host control protocol (DHCP) Server Address field 435, a Current Foreign Agent (FA) Address field 440, a Current Access Router Address field 445, and a Requested MIP Mobility Method field 450.

The Source ID field 405 indicates the originator of the message. The Destination ID field 410 indicates a remote MIH function that will be the destination of the request. The Current Link ID field 415 indicates the source link for handover. The New PoA Identifier field 420 indicates a new point of attachment identity. The Target PoA Identifier List field 425 includes a listing of potential points of attachment that the WTRU is considering for handover. Optionally, the list of potential points of attachment is sorted by preference, with most preferred points of attachment listed ahead of least preferred. The Current IP Configuration Method field 430 indicates current IP configuration methods. In one embodiment, this field is an optional field. The current DHCP Server Address field 435 indicates the IP address of a current DHCP Server. In one embodiment, this field is only included when the WTRU is using a dynamic address configuration. In another embodiment, this field is optional. The Current Foreign Agent (FA) Address field 440 indicates the IP address of a current FA. In one embodiment, this field is only included when the WTRU is using MIPv4. The Current Access Router Address field 445 indicates the IP address of a current access router. In one embodiment, this field is only included when the WTRU is using IPv6. In another embodiment, this field is optional. The Requested MIP Mobility Method field 450 identifies a WTRU preferred MIP mobility method. The MIH_Network_Address_Information Request message 400 may include all of the above described fields, or any sub-set of these fields, in any combination.

In one embodiment, the Requested MIP Mobility Method field 450 includes a Proxy Mobile IPv6 indicator at bit 14. Table 1 below illustrates one embodiment of the Requested MIP Mobility Method field 450.

TABLE 1

| Requested MIP Mobility Method | Bit map | Bits 0-31 | Bit 0: IPv4 static<br>Bit 1: IPv4 dynamic<br>Bit 2: Mobile IPv4 with FA (FA-CoA)<br>Bit 3: Mobile IPv4 without FA (Co-located CoA)<br>Bits 4-10: Reserved for IPv4 address configuration<br>Bit 11: IPv6 stateless address configuration<br>Bit 12: IPv6 stateful address configuration<br>Bit 13: IPv6 manual configuration<br>Bit 14: Proxy Mobile IPv6 |

Referring to FIG. 5, the MIH_Network_Address_Information Response message 500 includes a Source ID field 505, a Destination ID field 510, a Current Link ID field 515, a New PoA Identifier field 520, an IP Configuration Method field 525, a DHCP Server Address field 530, an Access Router Address field 535, and a Result Code field 540.

The Source ID field 505 indicates the originator of the message. The Destination ID field 510 indicates a MIH function that will be the destination of the message (i.e., the WTRU MIH). The Current Link ID field 515 indicates the source link for handover. The New PoA Identifier field 520 indicates the point of attachment of a new access network to which handover initiation is considered. The IP Configuration Method field 525 indicates the IP configuration method of the point of attachment identified in the PoA Identifier field 510. The DHCP Server Address field 530 indicates the DHCP server IP address of the point of attachment identified in the PoA Identifier field 510. The Access Router Address field 535 indicates the IP address of the access router associated with the point of attachment identified in the PoA Identifier field 510. The Result Code field 540 indicates a result code associated with the message. The MIH_Network_Address_Information Response message 500 may include all of the above described fields, or any sub-set of these fields, in any combination.

In one embodiment, the IP Configuration Method field 525 includes a Proxy Mobile IPv6 indicator at bit 14. Table 2 below illustrates one embodiment of the IP Configuration Method field 525.

TABLE 2

| IP Configuration Method | Bit map | Bits 0-31 | Bit 0: IPv4 static<br>Bit 1: IPv4 dynamic<br>Bit 2: Mobile IPv4 with FA (FA-CoA)<br>Bit 3: Mobile IPv4 without FA (Co-located CoA)<br>Bits 4-10: Reserved for IPv4 address configuration<br>Bit 11: IPv6 stateless address configuration<br>Bit 12: IPv6 stateful address configuration<br>Bit 13: IPv6 manual configuration<br>Bit 14: Proxy Mobile IPv6 |

Proxy MIP is currently defined as Network-based Localized Mobility Management (NETLMM) support for internet protocol version 6 (IPv6) capable networks. However, the evolution of NETLMM will likely lead to support of legacy internet protocol version 4 (IPv4) networks. In another embodiment, support of IPv4 proxy MIP may be indicated in the messages described above. This would similarly allow a WTRU to select the best handover target during network selection. Additional reserved bits could be used to request and advertise IPv4 functionality.

Figure 1:
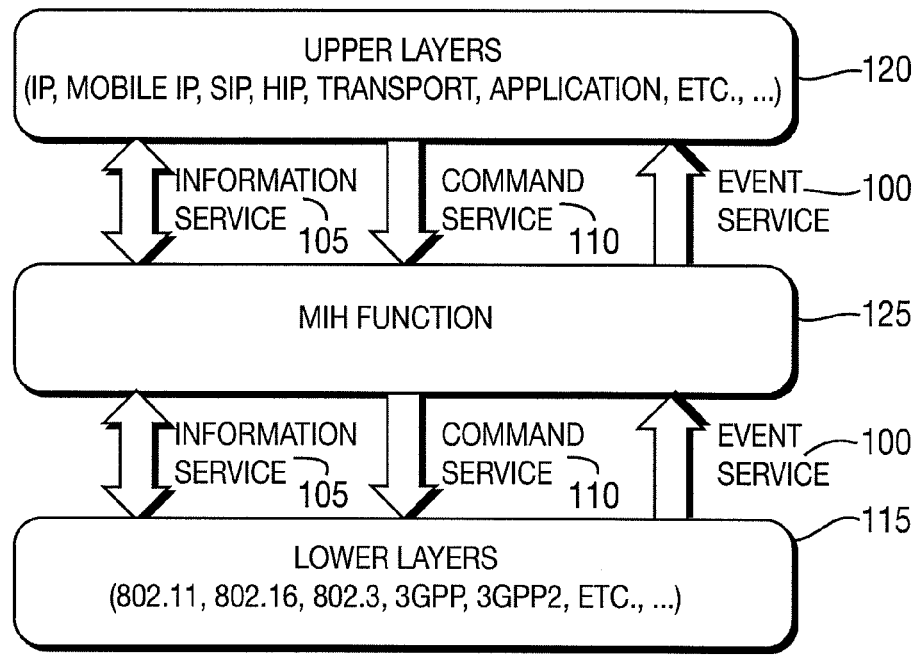
FIG. 1 is a block diagram of MIH services.
Figure 6:
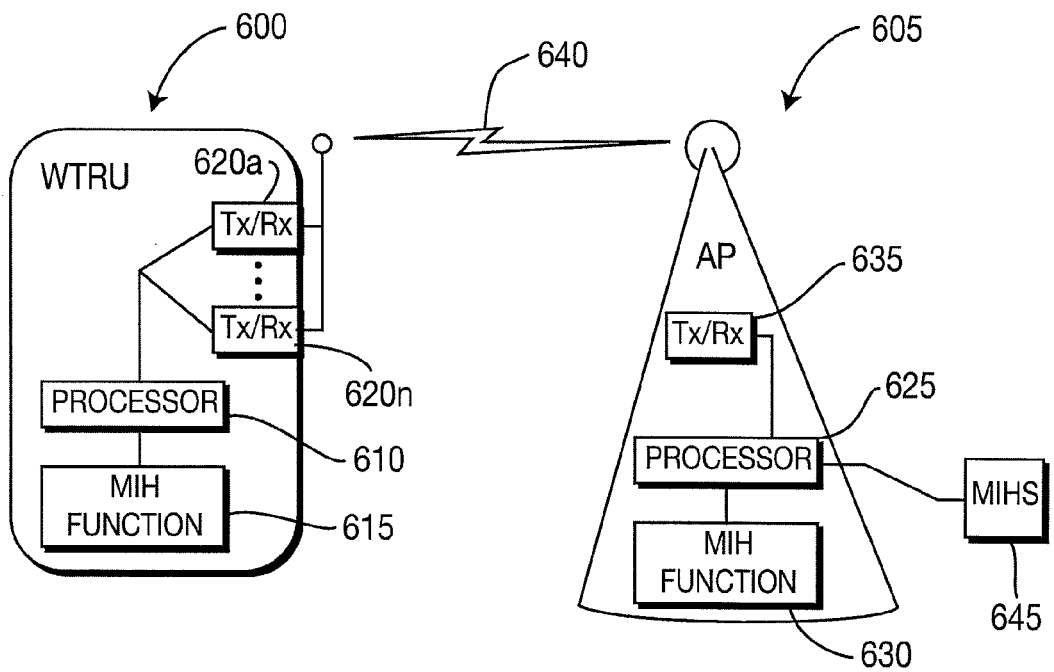
FIG. 6 is a block diagram of a WTRU and an access point configured to transmit and receive the messages of FIG. 4 and FIG. 5.

FIG. 6 is a WTRU 600 and access point 605 configured to transmit and receive MIH_Network_Address_Information Request and MIH_Network_Address_Information Response messages, as described above. WTRU 600 includes a processor 610, an MIH function 615, and a plurality of transceivers 620a . . . 620n. The processor 610 and MIH function 615 are configured to generate and process a MIH_Network_Address_Information Request message as described above. The plurality of transceivers 620a . . . 620n are configured to communicate in a plurality of different types of wireless communication systems using various radio access technologies, and to transmit a MIH_Network_Address_Information Request message as described above.

Access point 605 includes a processor 625, an MIH function 630, and a transceiver 635. The access point 605 communicates with WTRU 600 via air interface 640. The processor 625 of the access point 605 processes received MIH_Network_Address_Information Request message from WTRU 600 via air interface 640 and transceiver 635. The processor 625, in combination with the MIH function 630, of access point 605 forwards received MIH_Network_Address_Information Request message to MIHS 645 and receives MIH_Network_Address_Information Response messages from the MIHS 645. Received MIH_Network_Address_Information_Response messages are forwarded to the WTRU 600 via air interface 640.

Although the features and elements of the present invention are described in the embodiments in particular combinations, each feature or element can be used alone without the other features and elements of the embodiments or in various combinations with or without other features and elements of the present invention. The methods or flow charts provided in the present invention may be implemented in a computer program, software, or firmware tangibly embodied in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) module.

What is claimed is:

1. A method for use in a wireless transmit/receive unit (WTRU) for obtaining mobile internet protocol (MIP) information regarding a target point of attachment, the method comprising:
   the WTRU generating a query message that includes a mobility management protocol identifier field that identifies a preferred MIP version of the WTRU;
   the WTRU transmitting the query message to a server via a wireless network; and
   the WTRU receiving a response message from the server, wherein the response message is responsive to the query message, and wherein the response message includes an identifier of the target point of attachment and an identifier of a MIP version supported by the target point of attachment.

2. The method of claim 1, further comprising:
   the WTRU determining whether to perform a handoff to the target point of attachment based on the MIP version supported by the target point of attachment; and
   the WTRU performing the handoff to the target point of attachment.

3. The method of claim 1, wherein the MIP configuration method is a client MIP or a proxy MIP.

4. The method of claim 1, wherein the preferred MIP version of the WTRU is MIPv4.

5. The method of claim 1, wherein the preferred MIP version of the WTRU is MIPv6.

6. The method of claim 1, wherein the query message further includes the identifier of the target point of attachment.

7. The method of claim 1, wherein the server is a Media Independent Handover (MIH) server, and wherein the query message and the response message are MIH messages.

8. A method of for use in a server for providing mobile internet protocol (MIP) information regarding a target point of attachment, the method comprising:
   the server receiving a query message from a wireless transmit/receive unit (WTRU) via a wireless network, the query including an identifier of a preferred MIP version of the WTRU;
   generating a response message based on the query message, wherein the response message includes a mobility management protocol identifier field that identifies of the target point of attachment and an identifier of a MIP version supported by the target point of attachment; and
   transmitting the response message to the WTRU.

9. The method of claim 8, wherein the preferred MIP version of the WTRU is a client MIP version.

10. The method of claim 8, wherein the preferred MIP version of the WTRU is a proxy MIP version.

11. The method of claim 8, wherein the preferred MIP version of the WTRU is MIPv4.

12. The method of claim 8, wherein the preferred MIP version of the WTRU is MIPv6.

13. The method of claim 8, wherein the query message further includes the identifier of the target point of attachment.

14. The method of claim 8, wherein the server is a Media Independent Handover (MIH) server, and wherein the query message and the response message are MIH messages.

15. A wireless transmit/receive unit (WTRU) for obtaining mobile internet protocol (MIP) information regarding a target point of attachment, the WTRU comprising:
- a processor configured to generate a query message that includes a mobility management protocol identifier field that identifies of a preferred MIP version of the WTRU;
- a transmitter configured to transmit the query message to server; and
- a receiver configured to receive a response message from to the server, wherein the response message includes an identifier of the target point of attachment and an identifier of a MIP version supported by the target point of attachment.

16. The WTRU of claim 15,
- wherein the processor is further configured to determine whether to handoff to the target point of attachment based on the MIP version supported by the target point of attachment, and
- wherein the transmitter and receiver are configured to perform a handoff to the target point of attachment.

17. The WTRU of claim 15, wherein the preferred MIP version of the WTRU is a client MIP or a proxy MIP.

18. The WTRU of claim 15, wherein the preferred MIP version of the WTRU is MIPv4.

19. The WTRU of claim 15, wherein the preferred MIP version of the WTRU is MIPv6.

20. The WTRU of claim 15, wherein the query message further includes the identifier of the target point of attachment.

21. The WTRU of claim 15, wherein the server is a Media Independent Handover (MIH) server, and wherein the query message and the response message are MIH messages.

22. A server for providing mobile internet protocol (MIP) information regarding a target point of attachment, the server comprising:
- a receiver configured to receive a query message from a wireless transmit/receive unit(WTRU), the query message including an identifier of a preferred MIP version of the WTRU;
- a processor configured to generate a response message based on the query message, wherein the response message includes a mobility management protocol identifier field that identifies of the target point of attachment and an identifier of a MIP version supported by the target point of attachment; and
- a transmitter configured to transmit the response message to the WTRU.

23. The server of claim 22, wherein the preferred MIP version of the WTRU is a client MIP version.

24. The server of claim 22, wherein the preferred MIP version of the WTRU is a proxy MIP version.

25. The server of claim 22, wherein the preferred MIP version of the WTRU is MIPv4.

26. The server of claim 22, wherein the preferred MIP version of the WTRU is MIPv6.

27. The server of claim 22, wherein the query message further includes the identifier of the target point of attachment.

28. The server of claim 22, wherein the server is a Media Independent Handover (MIH) server, and wherein the query message and the response message are MIH messages.

* * * * *

UNITED STATES PATENT AND TRADEMARK OFFICE
CERTIFICATE OF CORRECTION

PATENT NO. : 8,238,261 B2
APPLICATION NO. : 12/062792
DATED : August 7, 2012
INVENTOR(S) : Olvera-Hernandez et al.

It is certified that error appears in the above-identified patent and that said Letters Patent is hereby corrected as shown below:

In claim 15, at column 7, line 11, before "server; and", insert --a--.

In claim 15, at column 7, line 12, after "message from", delete "to".

Signed and Sealed this
Ninth Day of April, 2013

Teresa Stanek Rea
*Acting Director of the United States Patent and Trademark Office*